Oct. 30, 1962 J. S. ROBBINS 3,061,287

FEEDING MEANS FOR ROTARY HEAD TUNNELING MACHINE

Filed April 17, 1959 5 Sheets-Sheet 1

INVENTOR
JAMES S. ROBBINS, DECEASED
BY WILLIAM W. MILLER, EXECUTOR
Murray A. Gleason
ATTORNEY Oct. 30, 1962 J. S. ROBBINS 3,061,287

FEEDING MEANS FOR ROTARY HEAD TUNNELING MACHINE

Filed April 17, 1959 5 Sheets-Sheet 2

INVENTOR

JAMES S. ROBBINS, DECEASED,

WILLIAM W. MILLER, EXECUTOR

BY Murray A. Gleason

ATTORNEY

FEEDING MEANS FOR ROTARY HEAD TUNNELING MACHINE

Filed April 17, 1959 5 Sheets-Sheet 3

INVENTOR.
JAMES S. ROBBINS, DECEASED,
BY WILLIAM W. MILLER, EXECUTOR

Murray A. Gleeson
ATTORNEY

INVENTOR.
JAMES S. ROBBINS, DECEASED,
BY WILLIAM W. MILLER, EXECUTOR
Murray A. Gleeson
ATTORNEY

INVENTOR.

JAMES S. ROBBINS, DECEASED,
BY WILLIAM W. MILLER, EXECUTOR
Murray G. Gleeson
ATTORNEY United States Patent Office 3,061,287

Patented Oct. 30, 1962

3,061,287

FEEDING MEANS FOR ROTARY HEAD TUNNELING MACHINE

James S. Robbins, deceased, late of Seattle, Wash., by William W. Miller, executor, Northfield, Ill., assignor to Goodman Manufacturing Company, a corporation of Illinois Filed Apr. 17, 1959, Ser. No. 816,353
5 Claims. (Cl. 262—7)

This invention relates to improvements in tunneling machines of the rotary boring head type and more particularly relates to such machines adapted to bore directly into relatively hard minerals such as rock and the like.

Another object of the invention is to provide a simpler and more efficient rotary tunneling machine of the class described in which the ability to steer up and down is improved by carrying the weight of the machine on the ground closely adjacent the boring head and placing the point of up and down tilting movement of the machine closely adjacent the cutting plane of the boring head.

A further object of the invention is to provide an improved tunneling machine of the class described having a rotary boring head, boring directly into the working face of the tunnel with a shield extending partially about the rear of the boring head and guiding the machine along the tunnel bore and transferring the mined material for discharge on the conveyor of the machine, in which the shield forms a part of the frame structure of the machine and carries a greater part of the weight of the machine on the ground, closely adjacent the cutting plane of the boring head.

A still further object of the invention is to provide a tunneling machine of the rotary boring type in which feeding of the machine is improved by the provision of a self-equalizing propulsion system for the machine.

These and other objects of the invention will appear from time to time as the following specification proceeds and with reference to the accompanying drawings wherein.

Figure 1:
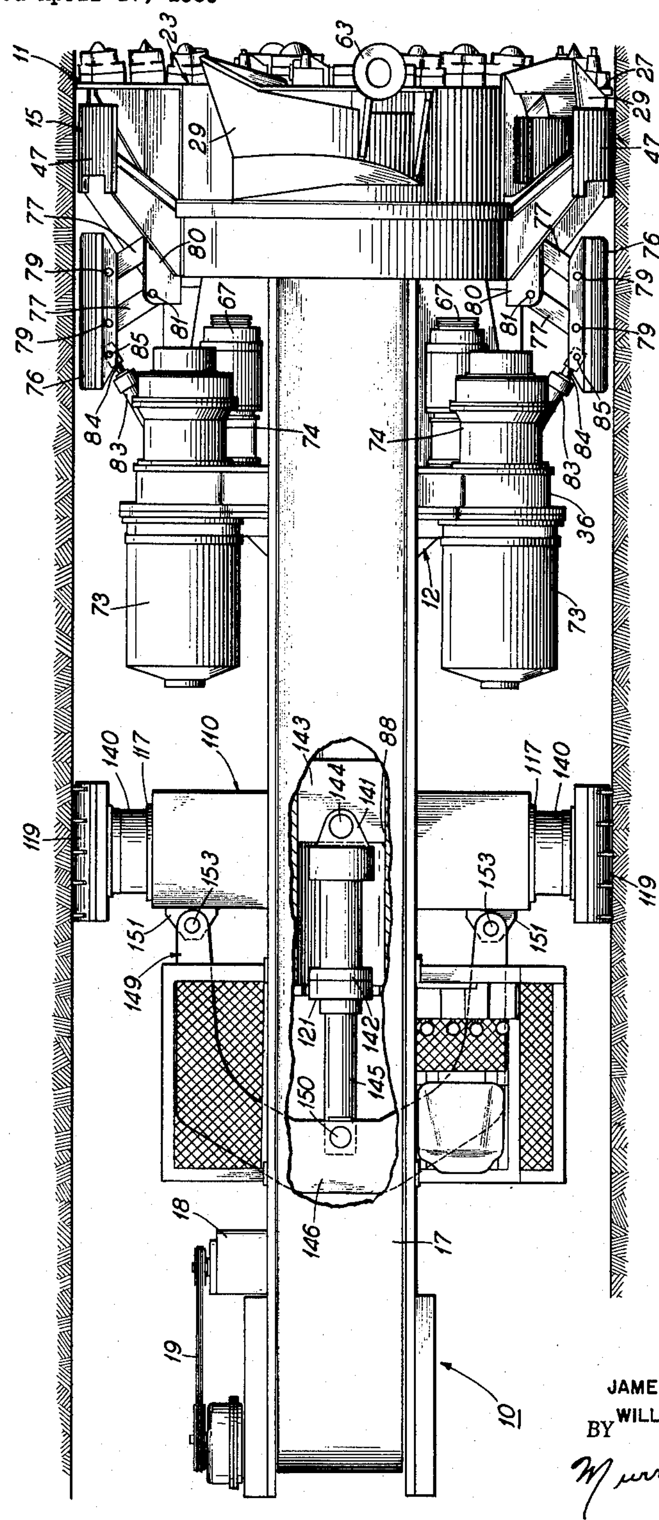
FIGURE 1 is a top plan view of a tunneling machine constructed in accordance with the invention, with certain parts thereof broken away and certain other parts shown in horizontal section.
Figure 2:
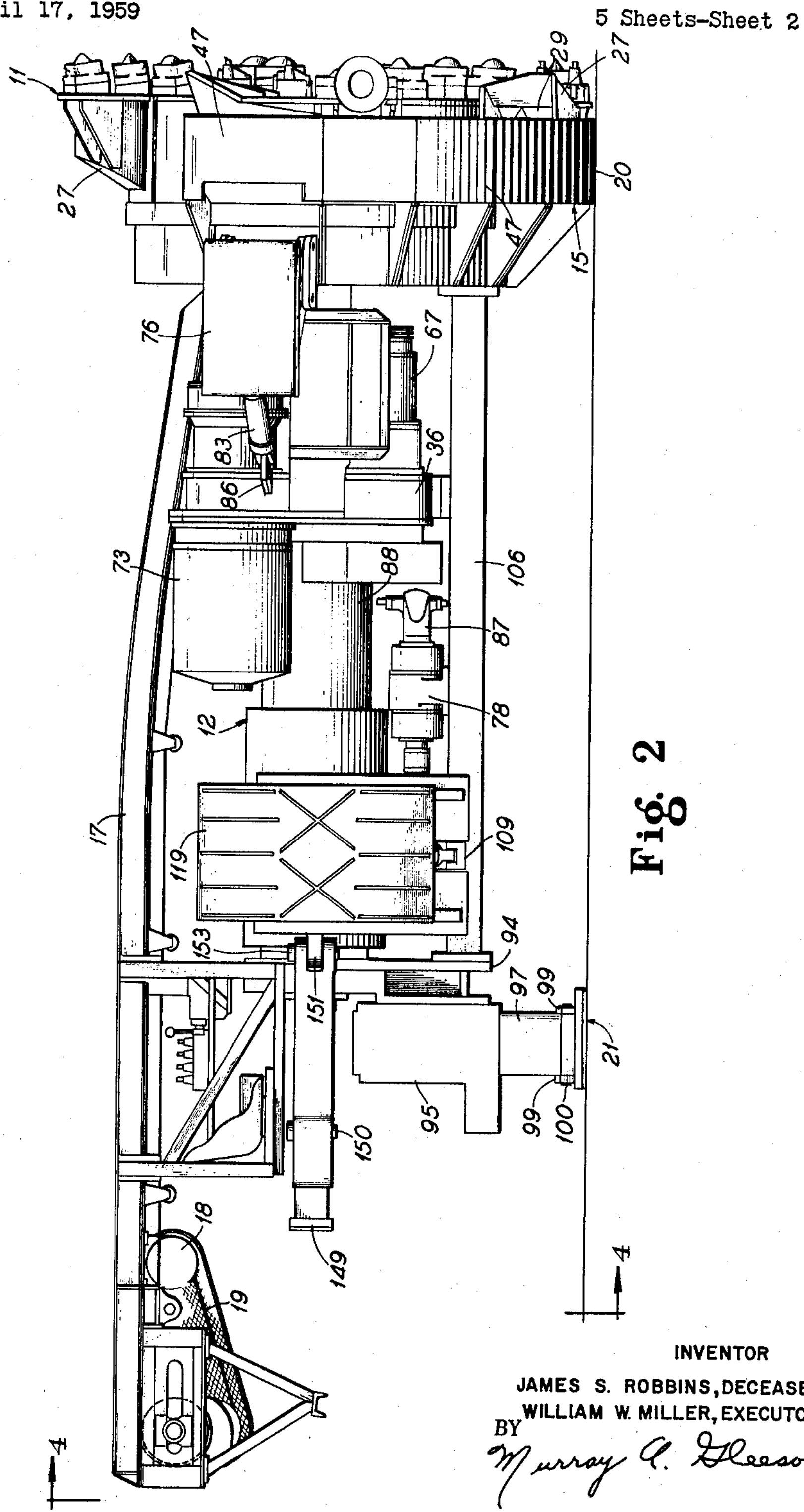
FIGURE 2 is a view in side elevation of the machine shown in FIGURE 1.

In the embodiment of the invention illustrated in the drawings, a tunneling machine 10 is shown as having a rotary cutter or a boring head 11 at the front of the machine, rotatably supported on a main frame 12 extending a substantial distance rearwardly of said boring head.

The main frame 12 has a shield 15 at the forward end thereof, extending along the rear portion of the boring head 11 and having a chute portion 16 adjacent the upper end portion thereof, for guiding the mined material onto the receiving end of a conveyor 17. The conveyor 17 is mounted in an elevated position on the main frame 12 and extends therealong from the chute portion 16 of the shield 15, to a point beyond the rear end thereof, for discharging the mined material onto a material carrying device (not shown) for transporting the mined material away from the machine. The conveyor 17 is shown in FIGURE 1 as being driven from a motor 18 through a chain and sprocket drive 19.

The machine is supported adjacent its forward end on a shoe 20, shown as being secured to and a part of the shield 15. It will here be noted that the shoe 20 extends forwardly to a position adjacent the cutting surfaces of the boring head 11 and conforms substantially to the form of the tunnel bore to slidably support a greater part of the weight of the machine at the forward end of the machine. The shoe 20 thereby accommodates tilting of the boring head at the forward end portion thereof, closely adjacent the cutting surface of the boring head, and thereby facilitates up and down steering of the machine, by operation of a tilting shoe 21 at the rear end portion of the main frame 12, operable to tilt the machine and boring head about the forward end of the shoe 20 close to the cutting plane of the boring head, as will hereinafter more clearly appear as this specification proceeds.

The boring head 11 includes a central disk 23 having a front face 24 and a rearwardly spaced rear face 25 and also having circumferentially spaced boring or cutter arms 27 extending radially therefrom, with material gathering buckets 29 carried thereby. The buckets 29 pick-up the mined material from the ground and the tunnel face during rotation and advance movement of the boring head into the working face and discharge the mined material through the chute portion 16 of the shield 15 onto the receiving end portion of the conveyor 17 in a manner well known to those skilled in the art so not herein shown or described further. The shield 15 has a front wall 30 facing the rear wall 25 of the boring head 11 and has a central generally cylindrical housing portion 31 extending rearwardly therefrom and forming a bearing support for a boring head shaft 32 on spaced bearings 33, adjacent the front and rear of said cylindrical housing portion. The boring head shaft 32 has the boring head 11 keyed or otherwise secured to the forward end portion thereof and is shown as having a spur gear 35 keyed or otherwise secured to the rear end portion thereof, within an enlarged housing portion 36 of the cylindrical housing portion 31 of the shield 15.

The shield 15 also has a rear wall 37 spaced from the front wall thereof along the cylindrical portion 31 and having a generally cylindrical periphery 39, forming a bearing support for rearwardly projecting segmental support portions 40 of the boring head 11. The shield 15 also has a generally annular shouldered portion 41 projecting radially therefrom, forming a support for a thrust-bearing 43 engaged by the rear end portions of the rearwardly projecting segmental support portions 40 of the boring head. The thrust bearing 43 is also engaged by abutment portions 44 projecting rearwardly of the arms 27 and buckets 29, to take the axial thrust on the boring head during cutting.

The upper portion of the shield 15 opens toward the boring head to form the chute 16, and is provided with a flange 45 at the periphery of the wall 30, and forming a continuation of the cylindrical wall portion 39. The flange 45 and wall portion 39 engage a shouldered portion 46 of the boring head 11, and the rearwardly projecting arm portion 40 thereof during rotation of the boring head. The shield 15 also has the support shoe 20 secured to the bottom portion thereof and has a plurality of radially extending arcuate shoes 47 projecting radially therefrom and forming continuations of the shoe 20 and conforming to the wall of the tunnel bore (FIGURE 1) to guide and steady the boring head during the boring operation.

Figure 3:
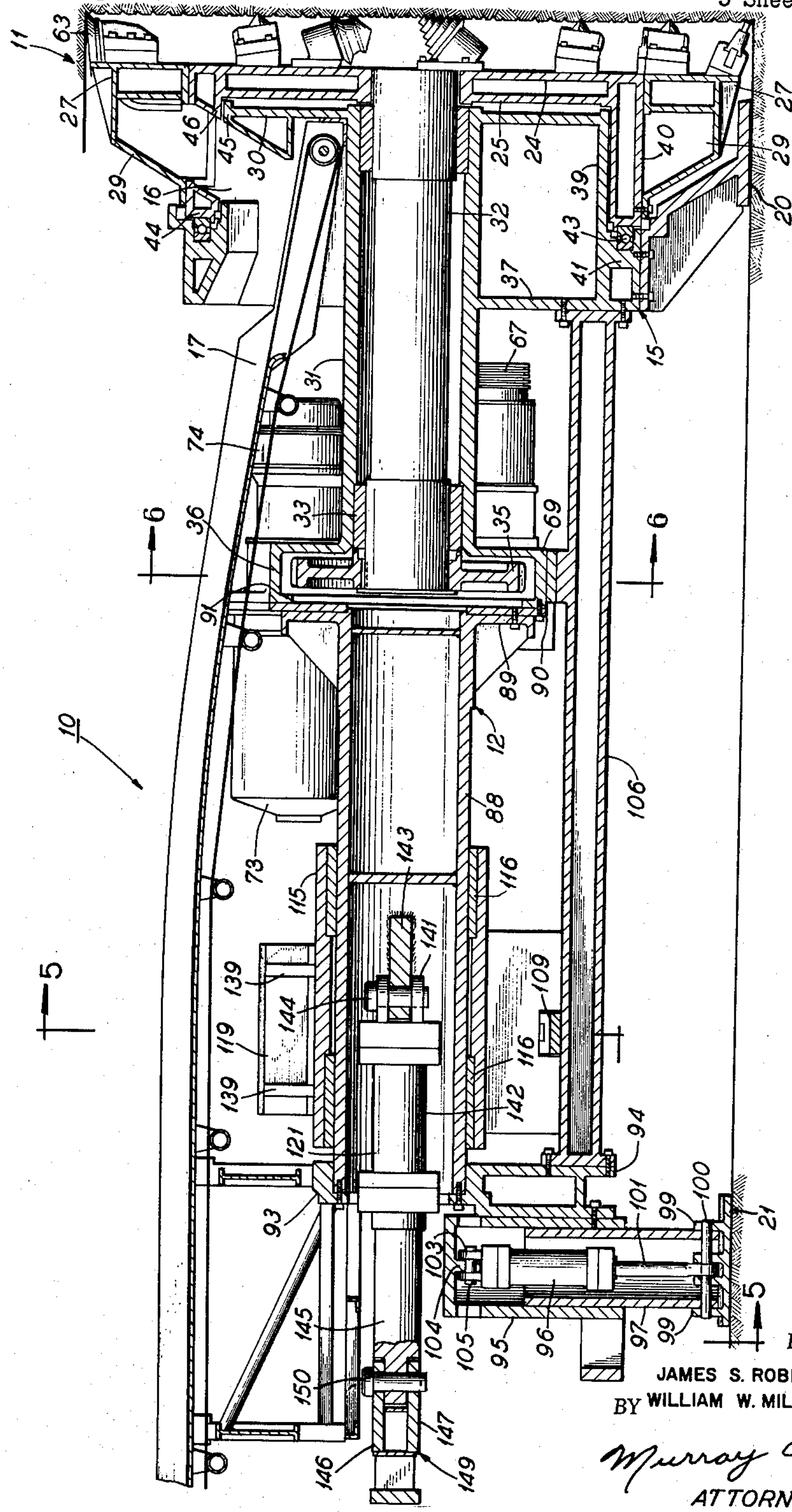
FIGURE 3 is a partial fragmentary longitudinal sectional view of the machine drawn to a slightly larger scale than FIGURE 2.
Figure 4:
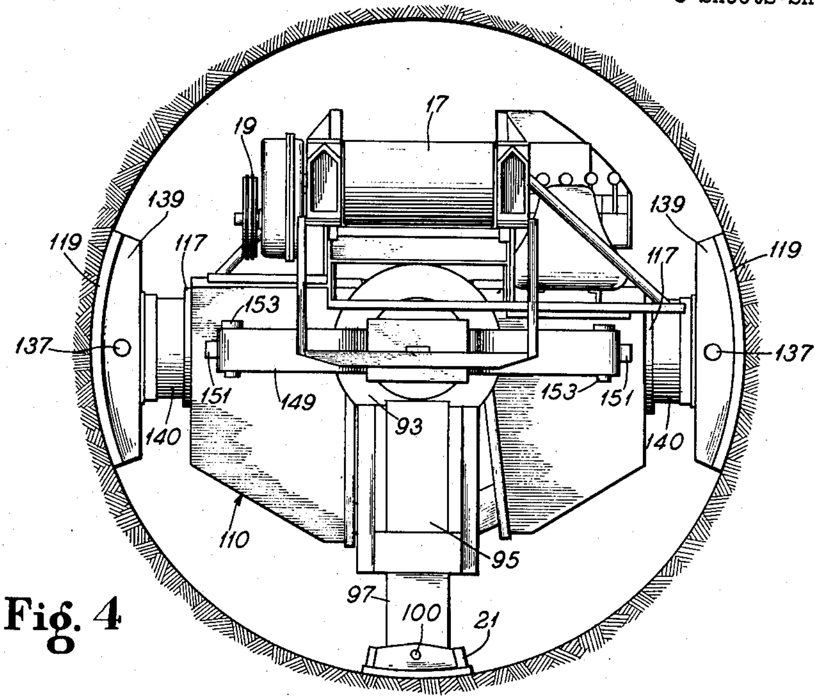
FIGURE 4 is an end view of the machine looking toward the rear end thereof and drawn to substantially the same scale as FIGURE 3.

The shaft 32 and boring head 11 are driven by four motors 67 mounted on a forward face 69 of the housing portion 36 for the gear 35, and projecting forwardly therefrom (FIGURES 1 and 3). The motors 67 have motor shafts 70 projecting rearwardly therefrom within the housing portion 36, having spur pinions 71 keyed or otherwise secured thereto, meshing with the spur gear 35 on the rear end of the cutter head drive shaft 32.

The housing portion 36 also forms a mounting for laterally spaced motors 73 on one side thereof and generators 74 on the opposite side thereof. The shafts of the motors 73 and associated generators 74 are in alignment with each other and are coupled together by couplings 75 (FIGURE 6) to effect a drive from the motors 73 to the associated generator 74 and supply current to the motors 67, a motor 78 driving a pump 87 for supplying hydraulic pressure for the hydraulic operating parts for the machine and the motor 18. In the present instance the motors 73 are energized from an alternating current power line of a relatively high voltage, while the generators 74 deliver alternating current at a reduced voltage.

The machine is guided in the tunnel bore rearwardly of the shoes 47 on the shield 15, and is shifted laterally a limited amount by means of two arcuate shoes 76, one being mounted on each side of the shield 15 for slidable engagement with the tunnel wall.

The shoes 76 are mounted on opposite sides of the shield 15, for movement with respect thereto toward and from the tunnel wall, on parallel links 77, pivotally connected to said shoes at their outer ends on pivot pins 79 and pivotally connected at their inner ends to brackets 80 on pivot pins 81. The shoes 76 are moved toward and from the tunnel wall by means of hydraulic jacks 83 including piston rods 84 pivotally connected to the shoe 76 on pivot pins 85 and extending angularly rearwardly and inwardly therefrom. The hydraulic jacks 83 in turn are pivotally connected to ears 86 extending laterally from the main frame 12.

The paralel links 77 are so pivoted to the brackets 80 and shoes 76 that frictional engagement between said shoes and the tunnel wall will tend to move said shoes away from the tunnel wall and thereby tend to prevent binding between said shoes and the tunnel during advance of the machine for mining.

Suitable control valves (not shown) and fluid pressure connections (not shown) are provided to control the admission and release of fluid under pressure to the head and piston rod ends of the jacks 83, either individually or simultaneously to engage the arcuate shoes 76 with the tunnel wall and shift the forward end portion of the machine laterally a limited amount in one direction or another and to accommodate the arcuate shoes 76 to slidably move along the tunnel wall during advancing movement of the machine and form a guide therefor.

The feeding, aligning and holding means for the machine includes a cross frame structure 110 guided for movement along and about a cylindrical guide portion 88 of the main frame 12. Said cylindrical guide portion extends rearwardly of the housing portion 36, and has a flanged forward end portion 89, shown in FIGURE 3 as being secured to an annular plate 90, which in turn is secured to an inwardly extending flanged portion 91 of the housing 36.

The cylindrical guide portion 88 is supported at its rear end on the tilting shoe 21 through a frame member 93 extending about the rear end portion of said cylindrical guide portion and suitably secured thereto. The frame member 93 has a depending leg 94 having a cylindrical closure and support 95 for a cylinder and piston unit 96 mounted thereon and extending therealong. A cylindrical closure 97 is slidable within the support and closure 95, and is connected to the tilting shoe 21 at its lower end, inwardly of spaced ears 99 extending upwardly of said shoe, on a pivot pin 100 extending through said ears. The pivot pin 100 also forms a pivotal connection for the lower end of a piston rod 101 of the cylinder and piston unit 96. The head end of the hydraulic cylinder and piston unit 96 is shown as having spaced ears 103 extending upwardly therefrom and extending along opposite sides of a lug 104, extending downwardly from the head of the support and closure 95, and pivotally connected thereto as by a pivot pin 105. The admission of fluid under pressure to either end of the cylinder and piston unit 96 serves to tilt the machine about the forward end portion of the tilting shoe 20, to maintain the boring head in the proper cutting plane, and to steer the machine upwardly or downwardly. Suitable control valves and fluid connections connected with the pump 87 and a fluid storage tank (not shown) may be provided to supply fluid under pressure to the head and piston rod ends of the hydraulic cylinder and piston unit, at the selection of the operator of the machine.

Figure 6:
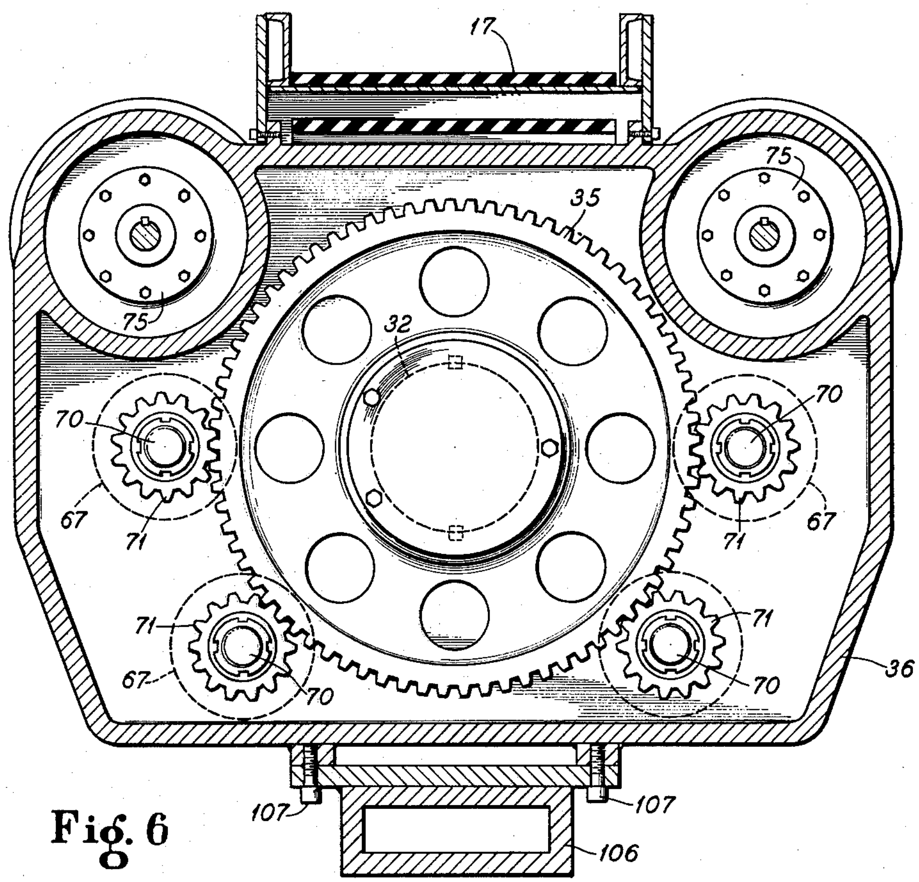
FIGURE 6 is an enlarged fragmentary sectional view taken substantially along line 6—6 of FIGURE 3.

A brace and guide beam 106, shown in FIGURES 3 and 6 as being hollow, and as being of a box-like form in cross-section is connected between the rear wall 37 of the shield 15 and the forward wall of the depending lug 94 and extends along and beneath the cylindrical portion 31 of the shield 15 and the cylindrical guide portion 88 of the main frame 12, and is connected intermediate its ends with the bottom of the housing 36, as by cap screws 107 (FIGURE 6).

The beam 106 besides bracing the leg 94 and tilting shoe assembly also serves as a guide for an inverted channelled guide member 109 connected with opposite end portions of the cross frame structure 110 by hydraulic jacks, including cylinders 111 and piston rods 112.

The cross frame structure 110 includes a sleeve 115 encircling the housing portion 88 and slidably mounted thereon on spaced bearings 116. It also includes hollow arms 117 extending laterally from the sleeve 115 in diametrically opposed relation with respect to each other. The hollow arms 117 form slidable supports for anchoring or holding shoes 119, engageable with the tunnel wall and forming a reaction means for a hydraulic feeding jack 121, to accommodate said feeding jack to advance the boring head 11 into the tunnel face, as will hereinafter be more clearly described as this specification proceeds.

The cylinders 111 and piston rods 112 besides holding the cross frame structure 110 in the desired position, also react against the guide member 109, and beam 106, to restore the main frame 12 to its normal upright position as when the torque reaction of cutting may cause the entire machine to creep circumferentially of the tunnel wall, as in my application Serial No. 671,574, filed July 12, 1957, and entitled "Tunneling Machines," now Patent No. 2,925,258.

The cylinders 111 are pivotally mounted on lugs 123 depending from opposite ends of the cross frame structure 110 on pivot pins 124 extending through said lugs and through spaced connecting ears 125 extending from the head ends of the cylinders 111. The piston rods 112 in turn have bifurcated end portions extending along opposite sides of connectors 126, extending angularly outwardly and upwardly from the guide member 109, and are pivotally connected to said connectors as by pivot pins 127.

The arcuate holding shoes 119 are engaged with the tunnel bore and held in engagement therewith as by hydraulic jacks 130. As herein shown, the jacks 130 include cylinders 131 having ears 132 extending from the head ends thereof, and pivotally connected to connectors 133 within the arms 117, as by pivot pins 135. The cylinders 130 have piston rods 136 extensible therefrom and pivotally connected to the inner portions of the arcuate anchoring shoes 119, as by pivot pins 137, mounted at their ends in spaced reinforcement plates 139, extending along the inner sides of the anchoring shoes 119. The pivot pins 137 also form pivotal supports for guide cylinders or housing 140 slidably mounted within the hollow arms 117.

The feeder jack 121 has spaced connectors 141 extending along opposite sides of a cross bar 143, connected between opposite inner sides of the housing 88. A pivot pin 144 is provided to pivotally connect the connecting ears 141 to the cross bar 143. A piston rod 145 extensible from the piston rod end of the cylinder 142, has a reduced end portion extending between top and bottom side plates 146 and 147 of a yoke 149, and pivotally connected thereto as by a pivot pin 150. The legs of the yoke 149 are spaced outwardly of the center of the machine adjacent the outer end portions of the cross frame structure 110, and are pivotally connected to ears 151, extending rearwardly from said cross frame structure, as by pivot pins 153.

When it is desired to advance the rotary boring head 11 toward the working face, the two anchoring shoes 119, at opposite sides of the cross frame structure 110 are forced into anchoring engagement with the wall of the tunnel, with the piston rod 145 of the hydraulic jack 121 in its retracted position. Hydraulic pressure is then admitted to the head end of the cylinder 142 of the hydraulic jack 121 to advance the machine toward the working face. During this advancing movement, the anchoring shoes 119 will remain in anchoring engagement with the tunnel wall until the main frame and machine has advanced a distance corresponding to the working stroke of the piston rod 145 and the support shoe 20 and the shoes 47 of the shield 15 will slide along the tunnel wall. The guide shoes 76 may also slidably engage the tunnel wall, and slide therealong, to maintain the machine in alignment with the tunnel wall.

When the piston rod 144 has reached the end of its stroke, the advance of the machine is temporarily discontinued and the anchoring shoes 119 are disengaged from the tunnel wall, by the admission of fluid under pressure to the piston rod ends of the cylinders 131. The cross frame structure 110 and the yoke 149 are then advanced along the cylindrical housing 88 by the admission of fluid under pressure to the piston rod end of the cylinder 142 of the jack 121, to retract the piston rod 145 for the full length of its stroke. The anchoring shoes 119 are then extended into engagement with the tunnel wall, to anchor the cross frame 110 in its advanced position. Feeding movement of the boring head 11 may then be resumed by the supply of fluid under pressure to the head end of the cylinder 142 of the jack 121.

It should here be noted that the feeding reactions on the cross frame structure 110 are adjacent the outer end portions of said cross frame structure and close to the tunnel wall. The feeding force is also applied to the yoke 149 adjacent the center thereof and along the axis of rotation of the boring head.

The yoke 149 and the three spaced pivot pins 153, 153 and 150 thus form an equalizing reaction member automatically equalizing the forces on each side of the cross frame structure and maintaining the machine in centered relation with respect to the tunnel bore during advance of the machine along the bore.

When it is desired to tilt the machine vertically and thereby change the direction of advance of the boring head in the tunnel, either at an increased or decreased vertical angle or gradient, the tilting shoe 21 is vertically extended or retracted by operation of the hydraulic jack 96, tilting the machine about the forward end of the support shoe 20 and close to the cutting plane of the boring head and thereby tilting the boring head at the head proper, so as to avoid interference of the shield or support frame for the head, when tilting the head up and down.

When it is desired to deviate the path of advance of the machine laterally in one direction or another with respect to the tunnel, one guide shoe 76 may be moved into engagement with the tunnel wall, while the opposite guide shoe may be retracted, to thereby steer the entire machine a limited degree toward one side or the other, during its feeding movement.

Lateral steering movement of the machine may also be effected by extending one of the shoes 119 on the cross frame 110 while retracting the opposite shoe. The entire frame may therefore be swung laterally about the shoes 47 and the shield 15, at the front of the machine.

Figure 5:
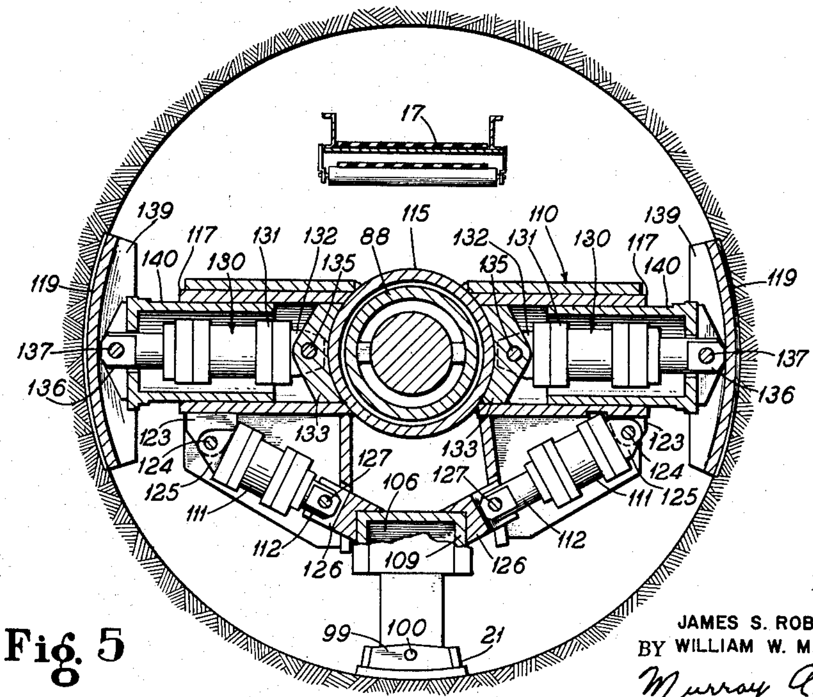
FIGURE 5 is a fragmentary sectional view taken substantially along 5—5 of FIGURE 3.

It should further be noted that if desired, both the rear anchoring shoes 119 and the front sliding shoes 76 can be operated in cooperation with each other to effect lateral steering of the boring head 11.

Where the torque reaction from the boring head 11 to the main frame 12 may cause the anchoring shoes 119 to creep circumferentially of the tunnel wall and thereby tilt the entire machine about the axis of the boring head, the machine may be restored to its normal upright position by first releasing the anchoring shoes 119 from the tunnel wall and then applying fluid under pressure to the head end of one cylinder 111 and releasing fluid under pressure from the head end of the opposite cylinder until the cross frame 110 is restored to its normal horizontal position. The anchoring shoes 119 may then be engaged in anchoring position against the wall of the tunnel, and the hydraulic cylinders 111 may be supplied with fluid under pressure in mutually reverse direction, so as to rotate or tilt the main frame in a clockwise direction about the axis of the boring head until it is restored to its normal upright position in the tunnel. The two hydraulic cylinders 111 may then be maintained under balanced pressures while the machine is in operation, so as to maintain the cross arm 110 in the horizontal position shown in FIGURE 5.

While there is herein shown and described one form in which the invention may be embodied, it should be understood that various modifications of the invention may be effected without departing from the spirit and scope of the novel concepts thereof.

What is claimed is:

1. In a tunneling machine, a main frame having a rotary boring head journalled thereon, means for supporting said main frame for slidable movement along the ground, means for feeding said boring head into a tunnel face comprising anchoring jacks extending transversely of said main frame having anchoring shoes on the outer ends thereof adapted to have anchoring engagement with the tunnel wall, said anchoring jacks and shoes forming a guide for said main frame, guiding said main frame for relative movement with respect to said anchoring jacks, a feeding jack having pivotal connection with said main frame for movement about a vertical axis intersecting the axis of rotation of said boring head, and a reaction member of said feeding jack pivotally connected with said feeding jack for movement about a vertical axis intersecting the axis of rotation of said boring head and pivotally connected with said anchoring jacks adjacent its outer ends for movement about vertical axes, for effecting the advance of said main frame and boring head with respect to said anchoring jacks upon the admission of fluid under pressure to said feeding jack and equalizing the feeding forces on said anchoring jacks.

2. In a tunneling machine, a main frame having a rotary boring head journalled thereon, means for supporting said main frame for slidable movement along the ground, a cross frame slidably mounted on said main frame in rearwardly spaced relation with respect to said boring head and forming a guide therefor, anchoring jacks carried by said cross frame, anchoring shoes slidably guided in said cross frame and connected with said anchoring jacks and engaged with the tunnel wall thereby, a feeding jack pivotally connected to said main frame for movement about a generally vertical axis intersecting the extended axis of rotation of said boring head, and a yoke vertically pivoted to said feeding jack intermediate its ends and pivotally connected to said cross frame for movement about vertical axes adjacent the outer ends of said cross frame.

3. In a tunneling machine, a main frame, a rotary boring head journaled on said main frame at the forward end portion thereof, a shoe at the forward end portion of said main frame supporting the forward end portion of said main frame and said boring head for slidable movement along the ground, a generally cylindrical housing extending along said main frame rearwardly of said boring head, a guide bar extending along said main frame in generally parallel relation with respect to said housing, a jack at the rear end of said housing and guide bar supporting the rear end portion of said main frame for slidable movement along the ground and tilting said main frame about said shoe, means for feeding said boring head into a tunnel face comprising a cross frame mounted on said housing for movement about the axis thereof and for movement therealong, anchoring jacks carried by said cross frame and having anchoring shoes at the outer ends thereof for anchoring engagement with the tunnel wall, a feeding jack mounted within said housing for pivotal movement about a vertical axis intersecting the axis of rotation of said boring head, said feeding jack extending rearwardly beyond said housing and having a yoke pivotally connected thereto intermediate the ends of said yoke for movement about a generally vertical axis, and vertical pivotal connections between opposite ends of said yoke and said cross frame structure adjacent the outer ends of said cross frame structure, the vertical pivotal connections between said main frame and said feeding jack, said feeding jack and said yoke and between opposite ends of said yoke and said cross frame providing a three point reaction equalizing the feeding forces on said feeding jack and said cross frame.

4. In a tunneling machine, a main frame having a rotary boring head horizontally journalled thereon, a ground engaging support shoe on said main frame conforming to the tunnel bore and supporting the forward end portion of said main frame and said boring head for movement along the tunnel floor, a tilting shoe at the rear end of said main frame having slidable engagement with the tunnel floor, a hydraulic jack supporting the rear end portion of said main frame on said tilting shoe and operable to tilt said main frame about the forward end portion of said support shoe, a cross frame mounted on said main frame for slidable movement therealong and for limited pivotal movement about the axis of rotation of said main frame, anchoring shoes slidably guided in said cross frame for anchoring engagement with the tunnel wall, anchoring jacks carried by said cross frame for engaging and maintaining said anchoring shoes in anchoring engagement with the tunnel wall, a hydraulic feeding jack pivotally mounted on said main frame for movement about a generally vertical axis intersecting the extended axis of rotation of said boring head and extending rearwardly of said main frame along the extended axis of rotation of said boring head, and a three point equalizing reaction connection between said hydraulic jack and said anchoring shoes comprising a yoke pivotally connected with said cross frame adjacent the outer end portions thereof for movement about vertical axis, and a vertical pivot pin connecting said feeding jack with said yoke intermediate the points of connection of said yoke to said cross frame.

5. In a tunneling machine, a main frame, a rotary boring head journalled on said main frame and projecting forwardly of the forward end thereof, a shoe at the forward end portion of said main frame supporting said boring head for slidable movement along the tunnel floor, a housing extending rearwardly along said main frame from said boring head about the extended axis of rotation of said boring head, a tilting shoe at the rear end of said housing, a hydraulic tilting jack supporting said main frame and housing on said tilting shoe and operable to tilt said main frame and boring head about said first mentioned shoe at the forward end portion of said main frame, a cross frame structure slidably mounted on said housing for movement therealong and for pivotal movement with respect thereto about the extended axis of rotation of said boring head, jack means connected between opposite end portions of said cross frame structure and said main frame for maintaining said main frame level, anchoring shoes slidably mounted in said cross frame structure, hydraulic jacks carried by said cross frame structure for engaging said anchoring shoes with the tunnel wall, a feeding jack carried within said housing concentric with the axis of rotation of said boring head and pivotally connected with said housing for movement about a generally vertical axis, a yoke, vertical pivot pins connecting said yoke to said cross frame structure adjacent the outer end portions of said cross frame structure, and a third vertical pivot pin intersecting the extended axis of rotation of said boring head and pivotally connecting said feeding jack to said yoke intermediate the ends thereof.

References Cited in the file of this patent

UNITED STATES PATENTS

| | | |
|---|---|---|
| 1,284,398 | McKinlay | Nov. 12, 1918 |
| 2,766,978 | Robbins | Oct. 16, 1956 |
| 2,783,038 | Tracy | Feb. 26, 1957 |
| 2,864,600 | Kirkpatrick | Dec. 16, 1958 |
| 2,935,309 | McCarthy | May 3, 1960 |

UNITED STATES PATENT OFFICE

CERTIFICATE OF CORRECTION

Patent No. 3,061,287 October 30, 1962

James S. Robbins, deceased, by William W. Miller, executor

It is hereby certified that error appears in the above numbered patent requiring correction and that the said Letters Patent should read as corrected below.

Column 3, line 37, for "paralel" read -- parallel --; column 6, line 53, for "of" read -- for --.

Signed and sealed this 16th day of April 1963.

(SEAL)
Attest:

ERNEST W. SWIDER
Attesting Officer

DAVID L. LADD
Commissioner of Patents